United States Patent [19]

Schrenk

[11] Patent Number: 4,680,736
[45] Date of Patent: Jul. 14, 1987

[54] METHOD FOR OPERATING A USER MEMORY DESIGNED A NON-VOLATILE WRITE-READ MEMORY, AND ARRANGEMENT FOR IMPLEMENTING THE METHOD

[75] Inventor: Hartmut Schrenk, Haar, Fed. Rep. of Germany

[73] Assignee: Siemens Aktiengesellschaft, Berlin and Munich, Fed. Rep. of Germany

[21] Appl. No.: 603,146

[22] Filed: Apr. 23, 1984

[30] Foreign Application Priority Data

Apr. 26, 1983 [DE] Fed. Rep. of Germany ....... 3315047

[51] Int. Cl.[4] ............................................. G11C 7/00
[52] U.S. Cl. .................................................. 365/218
[58] Field of Search ............... 365/218, 222, 230, 189, 365/203, 185

[56] References Cited

U.S. PATENT DOCUMENTS 4,279,024  7/1981  Schrenk .......................... 365/218 X

OTHER PUBLICATIONS

Japanese Patent Application No. 54-148054, Jun. 15, 1981, English Language Abstract only.

Primary Examiner—Joseph A. Popek
Attorney, Agent, or Firm—Herbert L. Lerner; Laurence A. Greenberg

[57] ABSTRACT

A method for operating a user memory (ASP) which is designed as a non-volatile write-read memory and is provided with a control memory (KS) which records the number of erase operations performed at the user memory (ASP), includes the features that prior to each erase operation, a marker is stored in an empty memory location of the control memory (KS), and so that all erase operations are inhibited without such prior storage of the marker, and an apparatus for carrying out the method.

13 Claims, 3 Drawing Figures

FIG 1

METHOD FOR OPERATING A USER MEMORY DESIGNED A NON-VOLATILE WRITE-READ MEMORY, AND ARRANGEMENT FOR IMPLEMENTING THE METHOD

The invention relates to a method for operating (writing, reading, erasing) a user memory designed as a non-volatile write-read memory which is equipped with a control memory storing the number of the erase operations to be performed at the user memory, and to an arrangement for implementing the method.

Integrated semiconductor memories with programmable and non-volatile storage cells per se represent the general state of the art. For the present invention, especially electrically erasable memories of this kind, i.e., so-called E$^2$PROM memories, are of particular interest. Such E$^2$PROM memories are described, for instance, in "Electronics/Feb. 28, 1980, pages 113 to 117".

In the application of non-volatile write-read memories, there are cases, in which it is desirable in the interest of the security thereof of, to control the erasing operations of the stored data at the memory. This applies especially to integrated circuits in so-called chip cards, by means of which, for instance, consumption units or fee units or hours of operation are registered in associated electronically controlled automatic devices for purposes of accounting. It is therefore an object of the invention to describe a non-volatile but erasable memory of the type defined at the outset, in which the number of erase operations performed during the official use time of the circuit is automatically recorded in a non-erasable manner, so that unjustified erase manipulations can readily be recognized by checking the card, in contrast to the known circuits of the kind mentioned.

It is therefore an object of the invention to describe an integrated circuit which corresponds to the definition given above and is suitable particularly also for use in a chip card, and which furthermore is inexpensive and is designed so that unauthorized manipulations with respect to the memory content, are easily recognized in comparison with the conditions prevailing in normal non-volatile memories.

This problem is solved by the provision that prior to each erasing operation, a control bit is stored in a control memory, and that without such a prior storage of the control bit, all erasing operations are prevented.

Further embodiments of the invention as well as the arrangement for carrying out the method may be seen in the claims.

Since there are other non-volatile storage cells that can hardly be considered as electrically erasable storage cells for use in such an integrated circuit, i.e., so-called E$^2$PROM storage cells, it is sufficient to limit the discussion to this case for the further description of the invention. Due to the method proposed by the invention, the non-volatile user memory is supplemented by the control memory to form a memory combination in such a manner that every erasing operation is recorded unchanged in it. Registration of each erasing operation takes place particularly in the non-erasable, control memory which is addressed by the logic circuit of the integrated circuit which is designed as the security logic in such a manner that one bit each is stored in the control memory for each erase operation of the user memory.

Other features which are considered as characteristic for the invention are set forth in the appended claims.

Although the invention is illustrated and described herein as embodied in a method for operating a user memory designed as a non-volatile write-read memory, and arrangement for implementing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
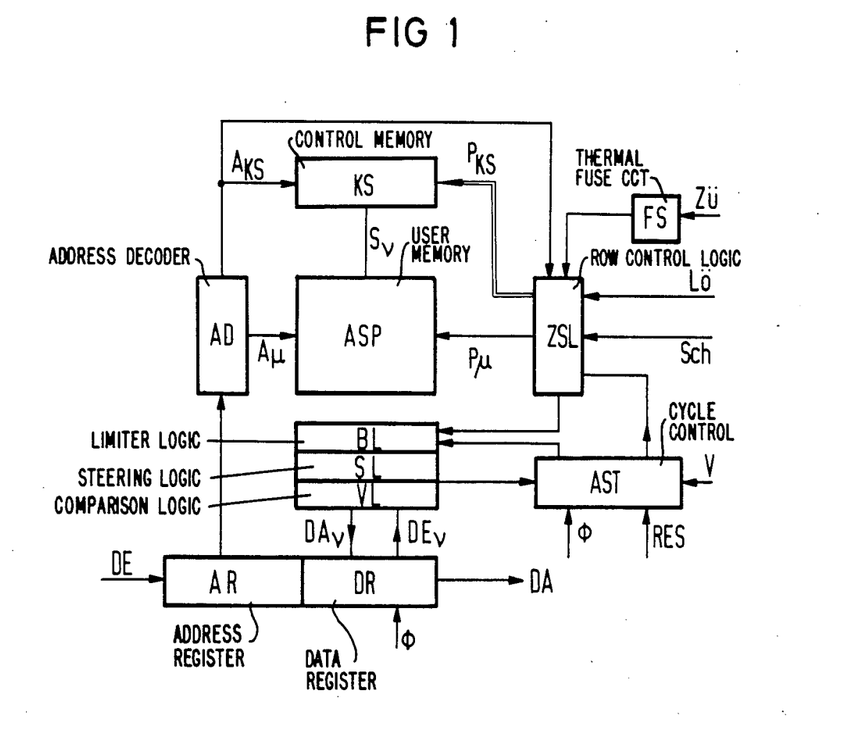
In FIG. 1 there is shown the block diagram circuit characteristic of the essence of the invention.

The heart of the block diagram shown in FIG. 1 is a storage area, which is built in the usual manner in the form of a matrix and is provided with connecting lines extending parallel to the rows and the columns of a user memory ASP, formed of non-volatile storage cells, and especially of E$^2$PROM cells An address decoder AD of conventional design is responsible for addressing the user memory ASP. The new data to be stored are entered via a data input DE which serves initially for addressing an address register AR and a data register DR. The address register AR and the data register DR together form a common shift register which is driven by a shift register clock $\phi$ and of which a number of directly series-connected register cells form the address register AR, and a further number of series-connected register cells form the data register DR.

The address data from the address register AR are entered into the address decoder AD, and the data to be written into the memory field ASP from the data register DR are read-out from the storage field ASP into the data register in the usual manner. The read-out data are made available via the data output DA.

The transmission of the data from the storage field ASP into the data register cells, in the case of the present invention, requires a particular design of the column logic which forms the connection between the individual column lines $S_v$ ($v$=number of the column line in question) and the register cells, in the data register associated with this column line. Besides the steering logic SL which controls the data transfer for writing and reading and is designed in the usual manner, a comparison logic VL further becomes necessary in the case of the present invention, as well as a limiter logic BL, the purpose and function of which will be presented following the description of FIG. 1.

The memory matrix ASP is acted upon by the address decoder AD row for row by address signals $A\mu$, where the subscript $\mu$ means the number of the matrix row addressed by the respective address signal $A\mu$ from the address decoder AD, or the row selection line (row line for short) which belongs to this matrix row and provides the addressing. With each of these addressing lines is associated a programming line $P\mu$ which provides the function of data entry or erasure, and which likewise runs parallel to the rows. This as well as the wiring of the individual E²PROM cell will be described in greater detail in connection with FIG. 2.

The essential part of the invention is the control memory KS, which can be designed as such in different ways. In the interest of the production technology as well as in the interest of a particularly advantageous operation, it is advisable, however, if also the control memory consists of the same cells as the user memory ASP. Advantageously, the control memory is incorporated in the memory matrix of the user memory ASP and more specifically in such a manner that the control memory KS and the user memory ASP have the column lines $S_\nu$ in common, while the lines $A\mu$ and $P\mu$ which run parallel to the rows are limited to the user memory ASP or to the control memory. This is, similarly, shown in FIG. 2. Thus, the user memory as well as the control memory by themselves can be addressed via the respective selection lines $A\mu$.

A further circuit section essential for the invention is the row control logic ZSL responsible for energizing the programming lines $P\mu$ in the user memory ASP and preferably also in the control memory KS and the cycle control AST which is of special construction for the problems stated in the present case, and which is also controlled by, among other things, the shift register clock $\phi$ for the shift register forming the address register AR and the data register DR. The cycle control AST is furthermore controlled by a comparison signal V and optionally, by a reset signal RES; it is the purpose of the row control logic ZSL to switch the respective programming lines $P\mu$ of the memory field to the conditions required for the individual operating states of the memory, i.e., reading, writing and erasing. For this reason, it is controlled by an external write signal Sch or erase signal Lö as well as by the cycle control AST.

In order for the control memory KS to be erased for testing purposes as many times as desired prior to its official use, without permanent loss of storage cells, a certain setting of the overall control of the memory is necessary. Shortly before its official deployment, the memory is switched, as already indicated above, to an unerasable memory condition by an appropriate change of the overall control. The circuit part FS suitable therefor is provided for this purpose with a fuse, which after blowing causes the control memory KS to lose its ability to erase. Thereby, also the number of erasing operations possible for the user memory ASP, which also was indefinite before, is now determined by the number of storage cells available in the unwritten condition in the control memory. When the fuse protection opens, the control memory will be erased.

In detail, the blocks of the block diagram shown in FIG. 1 of a circuit according to the invention have the following functions and properties:

1. User Memory ASP: This is realized as a memory field of matrix-like design with electrically erasable non-volatile storage cells and has n columns and m rows. After the activation of the circuit part FS, erasing this memory is possible only with a controlled number of erasing operations, which is achieved in cooperation with further parts of the block diagram according to FIG. 1 which were designated as essential for the invention. The memory can be designed so that all storage cells in the user memory are affected by the individual erase operations or so that the erasing process is limited to a selected portion, for instance, by addressing that portion.

2. Control Memory KS: This memory is designed and controlled so that it cannot be erased either from the start or due to a manipulation at a circuit section FS. On the other hand, however, it is acted upon during every erasing process in the user memory ASP by a control bit after its unerasability has become effective. This control bit is stored in a respective storage cell of the control memory KS. How this can be achieved in detail will be described later, in reference to FIG. 2.

3. Address Decoder AD: This is an ordinary decoder which, in the embodiment example according to FIG. 2, yet to be described, is designed as a so-called "1-of-m decoder" and serves for addressing the row selection lines A of the E²PROM memory field consisting of the user memory ASP and the control memory KS. In the embodiment example shown in FIG. 2, only one memory word of 1 byte is provided for each matrix row and therefore, only eight E²PROM cells are provided for one memory address. In larger designs, the individual matrix rows can also be associated, of course, with several addresses. In this case, the address decoder AD must also control the column lines $S_\nu$, which is accomplished in the usual way.

4. Address Register AR: Together with the data register DR, this forms a serial static or quasistatic shift register which is controlled by the clock $\phi$ and of which the information is shifted along by a clock pulse for each one register cell in the direction toward the data output DA. The number of register cells in the part AR of the common shift register AR and DR depends on the number of addresses to be selected. For instance, eight register cells are required for $2^8 = 256$ addresses for the address register AR.

5. Data Register DR: The number of register cells in the date register is equal to the number of column lines $S_\nu$ that are in connection therewith. For the case that the data word to be stored in the individual matrix rows is 8 bits long, there are eight column lines and therefore, a data register of eight series-connected shift register cells. One cell each is assigned to a matrix column, taking into consideration the order in the shift register according to the order of the matrix columns.

The connection between the individual register cells in the data register DR and the corresponding signal input DE or the data output DA of the corresponding column line $S_\nu$ is made via a section of the column logic which is designed in the usual manner, and more specifically during those operating phases, in which the shift register clock pulse $\phi$ for the shift register (forming the data register and the address register) is at the level "0" and therefore the data content in the address and data register DR is preserved.

6. Control Logic SL, Limiter Logic BL, Comparison Logic VL: While in the customary embodiments of E²PROM memories only transmission between the individual matrix columns $S_\nu$ and the control logic SL acting on the data register DR is required, a specially designed limiter logic BL and the comparison logic VL are necessary in the case of the invention. The limiter logic BL serves for limiting the voltage on the column lines S to the typical value provided for MOS logic circuits of 5 V, which, however, is sufficient only for reading out the data stored in the E²PROM cells belonging to the individual column lines S, but not for programming, (i.e., for writing-in data). This limitation also applies to the control memory KS if the latter is constructed from storage cells of the same type as the user memory ASP. Then, the mentioned voltage limitation must therefore be cancelled as soon as the memory circuit is acted upon by the signal Sch or Lö which initiated the write or erase process, respectively. One advantageous possibility in this connection will be described further with the aid of FIG. 2.

Finally, the control logic SL contains further a section $S_v$ per column which is associated with the comparison logic VL and serves for comparing the data of the control memory KS with the data in the data register DR. It is designed so that it recognizes the state "1" and the state "0" in the respective part of the control memory KS and serves for controlling the course of the erasing operation with counting control. By recognizing the state "1", an empty bit is determined and by recognizing the state "0", a writing operation pertaining to the corresponding column line is checked. Also here, a suitable embodiment is provided in FIG. 2.

7. Cycle Control AST: This part of the circuit has the purpose of controlling the write-read operation of the control memory KS. To this end, it is reset by the shift clock pulses $\phi$ which are provided at the same time for the address register AR and for the data register DR. It is at the same time controlled in the control logic part by the output of the comparison logic VL which controls in common all column lines $S_v$. Here, too, reference can be made to FIG. 2, with respect to a preferred embodiment.

8. Row Control Logic ZSL (=gate control logic): This circuitry determines, depending on the address, the voltage to the control gates of the storage transistor in the individual E²PROM cells with the aid of programming lines $P\mu$ of the matrix rows. This voltage is designated in the following with $U_P$. $U_P$ is only 5 V, typically, for reading-out and about 20 V if erasures are to be made. In addition, the row control logic ZSL prevents an erasure of the data in the control memory KS, as well as under certain conditions, erasure in the user memory ASP. (Such erasures are prevented in the user memory ASP with the circuit shown in FIG. 2 if no "1" is present at the output Q2 of FF2). already noted above, 9. Circuit Portion with Thermal Fuse circuit FS: As already noted above, this part of the circuit also makes possible erasing in the control memory when the fuse is intact, so that the former can be checked also in respect to erasing. Only after the fuse is opened by a firing signal Zü, is the control memory KS blocked permanently for further erasing operations. With respect to the design of the circuit portion FS, in the case of a control memory similarly consisting of E²PROM cells, reference is made to FIG. 2 which will be described hereinbelow.

Figure 2:
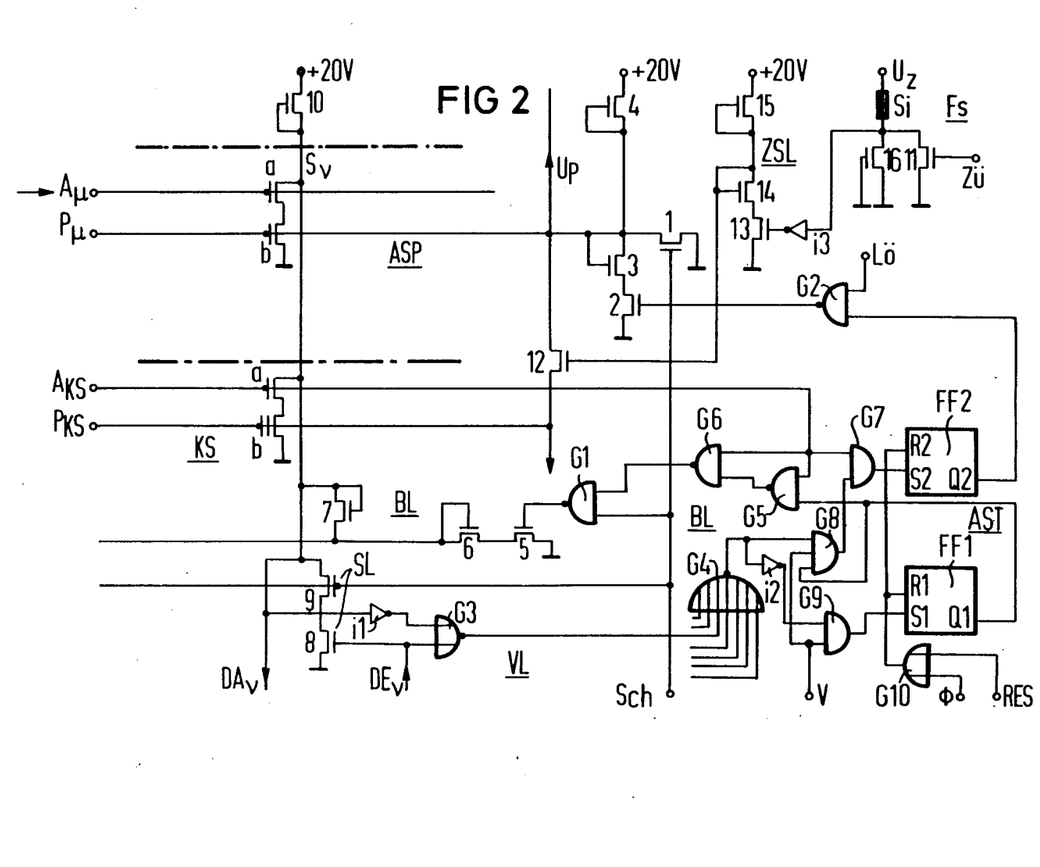
In FIG. 2, a preferred embodiment of the invention according to this block diagram is shown.

As may be seen from FIG. 2, the two-transistor E²PROM storage cells used therein consist of two series-connected self-blocking MOS field-effect transistors a and b of the same channel conduction type, preferably of the n-channel type, which is preferred for certain reasons also for the other transistors of the circuit shown in FIG. 2 including the transistors in the logic gates and the flip-flops. The one transistor a of the transistor pairs a, b forming the individual E²PROM cells is connected with its drain to the associated column line $S_v$ and with its gate to the selection line $A\mu$, which is controlled from the address decoder AD for that row $\mu$ of the memory field, to which the respective E²PROM cell belongs. The source terminal of the transistor a which is constructed as a normal switching transistor, and is called a selection transistor in the following explanation, is connected directly to the drain of the transistor b of the respective E²PROM cell, and the source thereof is connected to the reference potential, i.e., to ground. The transistor b serving as the storage transistor also has a floating gate, besides the control gate connected to the corresponding programming line $P\mu$. In addition, the gate insulation between the floating gate and the semiconductor substrate at a point usually designated as an erase window or thin oxide is particularly thin, so that there, due to the Fowler-Nordheim tunnel effect, charging (erase process) or discharging (write process) of the floating gate via the semiconductor substrate (consisting preferably of monocrystalline silicon) is possible. If the voltage between the drain of the selection transistor a and the source of the storage transistor b is designated $U_D$ and the address voltage which is to be fed to the individual row lines (and is referred to ground) is designated $U_A$, the values seen from the following Table are obtained for the individual modes of operation, in connection with the voltage $U_P$ introduced above between the control gate of the storage transistor b and ground:

|  | $U_A$ | $U_P$ | $U_D$ |
|---|---|---|---|
| Erase after "1" | 20 | 20 | 0 V |
| Write after "0" | 20 | 0 | 20 |
| No writing | 20 | 0 | 0 |
| Read | 20 | $U_{les}$ | "0"/"1" |

The read voltage is normally about 5 V. For the operation of the logic circuits, a supply voltage likewise of 5 V is required, if it is constructed with n-channel MOS technology.

The above-described connection of the two transistors a and b for the individual E²PROM cells can be seen from FIG. 2. For the sake of greater clarity, only a single column $S_v$ and in the latter, only one storage cell each of the user memory ASP and one storage cell from the control memory KS are shown. However, it should be noted that it is sufficient in many cases if the control memory KS is realized by only a single row of the memory matrix formed by the user memory ASP and the control memory KS, so that in that case, only one E²PROM cell per row line S is provided. Circuit-wise, FIG. 2 illustrates this case. The number n of columns can, for instance, be 8 and the number of rows in the user memory ASP equal to 31, while the 32nd row of the memory matrix forms the control memory KS.

Each column line is connected with the aid of a load element at one end to the terminals for a supply voltage of +20 V, while the other end of the column line forms a data output $DA_v$ of the memory matrix. The load element which is respectively associated with the individual column lines $S_v$ and is similar for all column lines, is realized as a MOS field-effect transistor 10, connected in the usual manner as a resistance, of the self-conducting type, of which the drain is connected to said supply terminal and of which the gate and source are connected to the respective column line $S_v$.

To meet the requirements described under item 5 tor the column logic, the parts SL, VL and BL forming it are constructed in conformance with FIG. 2, in the following manner:

(a) Control Logic SL: The output $DA_v$ of the v-th column line S is provided, in addition to the above-mentioned customary connection to the data register DR, also to a terminal having reference potential realized by the series circuit of two self-blocking MOS field-effect transistors 8 and 9. The transistor 9 which is connected with its drain to the data output $DA_v$, together with the corresponding other transistors 9 in the parts of the column logic belonging to the other columns $S_v$, is controlled by the write signal Sch which was mentioned above and is fed to the circuit externally. The transistor 8 of said series circuit is connected with its source to reference potential, and is controlled by the data input $DE_v$ which is associated with the respective matrix column and acted upon by the data register DR. All the transistor pairs 8 and 9 associated with the individual column lines form the control logic SL designed in the usual manner.

(b) Comparison Logic VL: This contains a common output gate G4 appertaining to all columns, and a number of identical circuit parts corresponding to the number n of the column lines $S_v$, which are associated with one matrix column line each in the manner shown in FIG. 2. The data output $DA_v$ of the respective column line $D_v$ is connected via an inverter i1 to the one input of a NOR gate G3, the other input of which is controlled by the data input $DE_v$ assigned to the respective matrix column v. The output of the NOR gate G3 assigned to the mentioned matrix column is connected to one input of the NOR gate G4, of which the remaining inputs are controlled in the manner just described for the respective NOR gate G3 constituting a part of the comparison logic associated with another column line S in such a way that a linkage of the kind described between each of the column lines S and said output gate G4 is provided. Due to the embodiment described of the comparison logic VL, it is seen directly that a "1" at a data output DA leads to a "0" at the output of the corresponding inverter i1 and thereby to a "1" at the output of the associated NOR gate G3, if a "0" is simultaneously present at the corresponding data input $DE_v$. For all other combinations of "1" and "0" on $DA_v$ and $DE_v$, a "0" is generated at the output of G3. The state "1" at the data output $DA_v$ of the individual column line $S_v$ means that there is in the respective column v an addressed E²PROM cell which, in addition, is still in the erased state. On the other hand, the state "0" for the data output $DA_v$ means that an addressed storage cell which belongs to the corresponding column is set to "0". A "0" at the output of G4 indicates that at least in one column v a still erased storage cell, indicated by $DA_v$="1", coincides with a write condition $DE_v$="0" in the data register. A "1" at the output of the common NOR gate G4 says that the last-mentioned state does not prevail. The output of the NOR gate G4 serves for addressing the cycle control AST, which is realized essentially by the two RS flip-flops FF1 and FF2.

(c) Limiter Logic BL: The column logic according to item 5 includes in addition the limiter logic BL which is controlled on the one hand by the cycle control AST and on the other hand, by the control memory KS. This part of the circuit BL contains three NAND gates G1, G5 and G6, a switching transistor 5 and at least one diode 7 per column line S which represents a connection from the individual column lines $S_v$ to the switching transistor 5 and via the latter to reference potential (ground). For this purpose, the column line $S_v$ is connected to the anode of the diode associated therewith (realized by the MOSFET 7) and its cathode either directly to a current-carrying terminal of the switching transistor 5 or, even better, to the anode of a further diode 6 which is common to the connection between the switching transistor 5 to each of the column lines $S_v$ and is realized by a MOSFET 6 and is in turn connected via its cathode to the current-carrying terminal of the switching transistor 5. The other current-carrying terminal of the switching transistor 5 is connected to reference potential (ground). The self-blocking MOS field-effect transistors 7 and 6, each representing a diode, are connected as such in the usual manner in that the gate and the drain of the respective transistor are connected to each other so that, due to the short circuit caused thereby of the p-n junction surrounding the drain zone of the respective transistor, its drain represents the anode and its source the cathode of the diode realized by the transistor.

For controlling the switching transistor 5, the output of the NAND gate G1 is now provided, of which the one input is controlled by the already mentioned external write signal Sch and the second input by the output of the NAND gate G6. The one input of the last-mentioned NAND gate G6 is directly connected to the selection line $A_{KS}$ of the control memory KS, so that this input is either at the level "0" or at level "1" according to the operating state of the selection line $A_{KS}$. The other input of the second NAND gate G6 is controlled by the output of the third NAND gate G5, the one input of which is likewise controlled by the selection line $A_{KS}$ of the control memory KS, and the other input by the cycle control AST by the not inverted output Q1 of the one RS flip-flop FF1 provided therein.

Obviously, the switching transistor 5 becomes conducting if a "1" is present at the output of the NAND gate G1 controlling it. This is the case either if the write signal Sch and/or the output of the NAND gate G6 is at the level "0". The latter is the case if an address Aks is selected and if at the same time the RS flip-flop FF1 in the cycle control AST is in the rest condition, so that a "0" is present at the other input of the NAND gate G5. If the switching transistor 5 conducts, this means that on the basis of the mentioned switching mode, current flows from the column lines $S_v$ provided with addressed storage cells to reference potential via the switching transistor 5. Because of the load resistance 10 in the individual column lines $S_v$, the voltage $U_D$ at the individual E²PROM cells of the corresponding column line $S_v$ drops relative to the value applicable in the cut-off state of the transistor 5.

It follows that the two operating states of the RS flip-flop FF1 in the cycle control AST are determining the operation of the limiter logic BL common for all columns of the memory field, in that, in the set state of this flip-flop, the input of the NAND gate G5 controlled by Q1 receives a "1" and in the rest condition, a "0".

In the absence of a write signal Sch, in order to provide a "1" at the output of the NAND gate G1 and thereby, the conducting state of the switching transistor 5, the logic state at the output of G6 and that of the inputs controlling this NAND gate G6 are of no importance. In this case, the limiter logic BL therefore becomes operative. If the write signal Sch, on the other hand, is present, the NAND gate G6 is responsible for the state of the switching transistor 5, since the transistor 5 is cut off by a "1" at its output. A "1" at the output of G6 is present, however, if at the output of G6 a "0" is present at least at one of the inputs of this NAND gate G6. If the address line $A_{KS}$ in the control memory is at the state "1", the state at Q1 is obviously responsible for whether the transistor 5 is conducting or cut off. With a "1" at Q1, the output of G5 acquires the state "0" if at the same time also $A_{KS}$ is at "1". Then, a "1" appears at the output of G6, so that the switching transistor 5 conducts with Sch="0" and is cut off for Sch="1". If on the other hand $A_{KS}$="0", it likewise follows that a "1" appears at the output of G6, so that in the presence of a write signal Sch="1" the switching transistor "5" is again cut off and in the absence of a write signal (i.e., Sch="0"), the transistor 5 conducts. In every case, in the absence of a signal Sch, the limiting logic BL is therefore connected if a "1" is present at the output Q1 of the flip-flop FF1. The purpose of the flip-flop FF1 in the cycle control AST is therefore to switch, among other things, the cancellation of the voltage limitation on the column lines S caused automatically by the limiter logic if the address $A_{KS}$ of the control memory is selected.

It should further be noted in this connection that the addresses in the user memory ASP are written without interference, while writing action in the control memory KS also depends on the operating state of the cycle control AST.

(d) Cycle Control AST and Row Control Logic ZSL: Besides the mentioned RS flip-flop FF1, the cycle control AST contains a second RS flip-flop FF2 as well as three AND gates G7, G8 and G9, an OR gate G10 as well as an inverter i2. According to FIG. 2, the following switching procedure is provided:

First, the clock signal $\phi$, which is at the same time provided for the clock control of the shift register AR, DR is applied, together with an external reset signal RES via the OR gate G10 to the reset input R1 of the first flip-flop FF1 and to the reset input R2 of the second flip-flop FF2. The setting input S1 of the first flip-flop FF1 is addressed by the output of the AND gate G9, the other input of which is controlled by an external validation signal V, and of which the other input is controlled by the output of the output of the comparison logic VL, i.e., the output of the NOR gate G4, via the inverter i2. The not inverting output Q1 of the first flip-flop FF1 is connected, as was already stated in connection with the limited logic BL, to the one input of the NAND gate G5 of this logic. It is further connected to the one input of an AND gate G8, the second input of which is controlled directly by the output NOR gate G4 of the comparison logic VL and the third input of which is controlled directly by the mentioned external comparison signal V. The output of the AND gate G8 is connected to one input of an AND gate G7, of which the second input is controlled by means of an inverter i4 by the address line $A_{KS}$ in the control memory KS, and the last input by the not-inverting output Q1 of the first flip-flop FF1.

The not-inverting output Q2 of the second flip-flop FF2 is connected to a NAND gate G2 which can be acted upon at its other input by an external erase signal Lö and of which the output controls the gate of a self-blocking MOS field-effect transistor 2. This field-effect transistor 2 forms a connection between the reference potential and a voltage divider 3, 4 leading to the supply potential =20 V. The voltage divider 3, 4 consists of a self-blocking MOS field-effect transistor 3, of which the source terminal is connected via the MOSFET 2 to reference potential (ground), and of which the drain and gate are connected to the source of the transistor 4 which is designed as a self-conducting MOSFET and of which the drain is connected to the terminal for the supply voltage of +20 V. The divider point between the two transistors 3 and 4 of the voltage divider serves for acting on the programming lines Pµ of the user memory ASP and, via a further MOS field-effect transistor 12 of the self-conducting type, for acting on the programming line $P_{KS}$ (and thereby on the control gate of the respective storage transistors b) in the control memory. The transistor 2, the voltage divider 3 and 4, as well as the connecting transistor 12 as well as the NAND gate G2 form in the embodiment according to FIG. 2 the row control logic ZSL, among which a self-blocking MOS field-effect transistor 1 must further be counted which is controlled by the write signal Sch and has the purpose of connecting, in the case of the mode of operation "write", the programming lines Pµ of the user memory (and with a highly conducting connecting transistor 12 of the control memory KS) to reference potential. Finally, the connecting transistor 12 and the circuit FS controlling it are basically also part of the row control logic ZSL.

The control of the connecting transistor 12 (which is self-conducting as stated above) is accomplished by the divider point of a further voltage divider which consists of the transistor 15 and the transistor 14. The transistor 15 which is realized as a self-conducting MOS field-effect transistor, is connected with its drain to the supply terminal carrying 20 V and with its gate and source terminal to the drain and the gate of the transistor 13. The latter is self-blocking and is connected to reference potential via its source and a further self-blocking transistor 13. The gate of the last-mentioned MOS field-effect transistor 13 is controlled by the output of an inverter i3. The latter is connected on its input side to the output of the circuit part FS.

This output is realized by a node, from which two mutually parallel MOSFET's lead to the reference potential and the fuse Si leads to a terminal for a firing voltage $U_z$. The one transistor 11 is of the self-blocking type and is controlled by a firing signal Zü. The other transistor 16, on the other hand, is self-conducting and is also connected with its gate to reference potential.

As long as the fuse Si is intact, a "0" is also present at the output of the inverter i3 if $U_z$ is applied, so that the transistor 13 is cut off. This means that the self-conducting connecting transistor 12 is open all the way since then, the voltage supplied to it by the divider point between the transistors 14 and 15 is sufficiently high. The situation is different if, due to the application of the firing signal Zü, the fuse Si has blown. Then the output of the inverter i3 is at "1" and the transistor 13 is in the conducting state. Thereby, the potential at the gate of the connecting transistor 12 drops, so that the latter is close to the cut-off state. Thereby, the voltage divider consisting of the two resistance transistors 3 and 4 is capable of making available to the programming line $P_{KS}$ in the control memory a voltage only sufficient for reading.

For erasing the information contained in the rows of the memory ASP (and, with the fuse Si intact in the circuit part FS, also of the control memory KS) it is necessary that the transistor 2 is transferred to the blocking state. To this end, it is necessary that a "1" is present at the non-inverting output Q2 of the erase flip-flop FF2 as well as at the input responsible for the erase signal Lö, of the NAND gate G2. In order to set the erase flip-flip FF2, a "0" must be present on the selection line $A_{KS}$ of the control memory KS, so that the control memory is addressed. Thereby, a "1" is applied to one input of the AND gate G7. Furthermore, a "1" must be present at the output of the comparison logic VL, i.e., at the output of the NOR gate G4, for setting the flip-flop FF2. Finally, also the first flip-flop FF1 must be in the set state, since it, too, is coresponsible for the control of the AND gate G7. As the last condition for setting FF1, the presence of the comparison signal V must be stated, since only then all conditions are met which are necessary for a "1" at the output of the AND gate G7. A "1" at the output of the comparison logic VL, i.e., at the output of G4, is again possible only if a "0" is present at the output of all NOR gates G3 in the comparison logic VL. This in turn is the case only if a "1" is present either at the data input $DE_v$ of all matrix columns $S_v$ or a "0" at the corresponding data output $DA_y$. This points out the condition for the erasing process.

For the write operation, the write signal Sch is required which, in addition to controlling of the NAND gate G1 provided in the limiter logic BL, also controls the above-mentioned self-blocking transistor 1 which forms the connection between all the programming lines in the user memory ASP and reference potential, and is therefore effective as a discharge transistor. If a write signal Sch is present, a voltage $U_P$ of about 0 V is present on the programming lines Pμ.

If neither an erase signal Lö nor a write signal Sch is present, then the transistor 2 conducts and the transistor 1 is cut off. Under these conditions, the voltage at the programming lines Pμ has the divider value of about 5 V (=read voltage $U_{les}$) determined by the transistors 3 and 4.

If with Q2="1", the erase signal Lö is present and the write signal Sch has the level "0", the transistor 1 as well as the transistor 2 is cut off. The voltage $U_P$ on the programming lines Pμ (and $P_{KS}$) floats via the resistance transistor 4 up to the value of 20 V so that an erase process is possible.

In writing, the transistor 5 is furthermore cut off, via the NAND gate G1, so that the effect of the voltage limitation due to the limiter logic BL is cancelled for all column lines $S_v$. For this reason, the voltage on the individual column lines $S_v$ can then adjust itself either to the value 0 V or to the value of the maximum voltage of 20 V as a function of the data information supplied from the data register DR to the respectively associated date input $DE_v$.

The operation according to the invention as per FIGS. 1 and 2 depends on the correct duration and orders of the control signals which, according to FIG. 2, must also be entered from the outside (see FIG. 3); they can be entered either, first, from a computer, or they may be integrated on the chip in an additional control circuit. LOE and SCH must have a duration sufficient for erasing or writing the storage cell. V is a short time interval, in which the result of a comparison operation can be transferred into the flip-flops of the cycle control. φ is the clock signal of the shift register which also resets the cycle control. Between the individual control signals, spacings in time must be provided, so that a quiescent state can settle between the control signals for the entire circuit.

Figure 3:
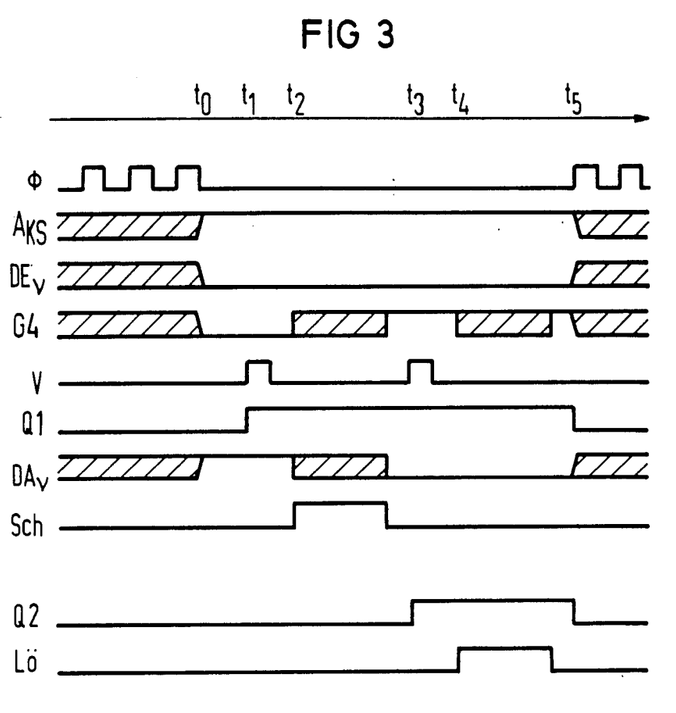
In FIG. 3, the timing of the signals required for the operation of a circuit according to FIGS. 1 or 2, is shown.

According to FIG. 3, the following signal waveform is obtained. At the time t1, a stable state adjusts itself in the shift register with the last clock pulse φ. Due to the set address Aks of the control register and the given data DEV in the data register, a "0" is present at the output of G4 with proper execution. The flip-flop 1 is set at the time t1 with a first release pulse V and Q1 goes to "1". Thereby, the limiting logic of the column voltage is cancelled when writing while Sch="1" (time t2). By the shifting, the set storage cell DEV goes to "0" and the output of G4 to "1". During a further release pulse V at the time t3, also Q2 is set and thereby, the erase blocking is cancelled. At the time t4 and during the erase signal LOE the user memory ASP is erased. The first clock pulse 0 not only changes data and addresses, but also resets both flip-flops.

To prevent erasing the control memory KS, all storage cells of the control memory KS are discharged and reset into the written state. Due to this measure, a discharge of the storage cells, for instance, in order to manipulate the memory content with fraudulent intent, causes no resetting into the original unwritten state.

I claim:

1. Method for operating a user memory which is designed as a non-volatile write-read memory comprising: storing, before each erase operation performed on the user memory, in a control memory a control bit in an empty memory location of the control memory, and inhibiting an erase operation on the user memory before having stored the control bit.

2. Method according to claim 1, having a row control logic operatively rsponsive to the control memory, which comprises engaging the control memory and blowing a fuse for converting the control memory into a non-erasable memory.

3. Method according to claim 2, which comprises forming a common matrix having at least one column line having storage cells of the user memory and at least one storage cell of the control memory, the user memory which can be addressed row-by-row and the control memory which can also be addressed row-by-row.

4. Method according to claim 1 which comprises including storage cells having dischargeable floating gates in the memory cells of the control memory; and discharging the floating gates, thereby preventing erasure of the control memory.

5. Method according to claim 1, which comprises checking the contents of the control memory; determining the state of the control memory; and allowing writing into the control memory in dependence upon the state of the control memory.

6. A non-volatile user and control memory comprising: a first plurality of memory cells, each having a storage transistor and a selection transistor, arranged as a matrix having a plurality of rows and a plurality of columns, a plurality of row-parallel address lines and a plurality of row-parallel program lines operatively engaging the memory cells of the respective rows; a plurality of column-parallel column lines having data outputs and data inputs; a data register having register cells each being connected to the respective data outputs and data inputs; a voltage supply connected with each of the column lines through a load resistor; a comparison logic for comparing the logic level of the respective register cells and the outputs of the memory having a common output a cycle control logic a limiter logic and a row control logic responsively connected to the common output and being controlled by the cycle control logic; said limiter logic serving for reducing the voltage normally applied to the column lines; said row control logic serving for controlling said program lines; said cycle control logic, said comparison logic, said limiter logic and said row control logic operatively inhibiting the erasing of data in the respective row of said user memory until a control bit has been stored in an empty memory location of the control memory.

7. Apparatus according to claim 6, said column lines each having a load resistor at one end connected to said voltage supply and forming said data output of the respective column at the other end, a connection to reference potential in the form of two series-connected self-blocking MOS field-effect transistors connected to said data output; the first one of said series connected transistors being controlled by a signal input for the respective column and the second transistor being connected with its drain to the respective column line being controlled jointly with the second transistors corresponding thereto in the other column lines, by an external write signal.

8. Apparatus according to claim 7, including an input part of the comparison logic assigned respectively to a column line, the input part being in the form of an inverter which is connected on the input side to the data output of the individual column line, the output of the column line being connected with the data input, a NOR gate being controlled by said data input assigned to the respective column line, the NOR gate forming the respective output of an input part of the comparison logic assigned to a column line for controlling an output each of a further NOR gate forming the common output part of the comparison logic and the output thereof being provided for controlling the cycle control.

9. Apparatus according to claim 8, including a first RS flip-flop included in the cycle control which is in turn controlled at its setting input, a second RS flip-flop controlled at its setting input by the output of said NOR gate of the comparison logic; the output of the common NOR gate being connected to one input of a first AND gate; an inverter being connected between said NOR gate and said first AND gate, the first AND gate having another input controlled by an external release signal; the output of the first AND gate being connected to a setting input of the first flip-flop; the NOR gate being connected with its output to a first input of a second AND gate, the second input of the second AND gate being controlled by said oomparison signal; a third input of said second AND gate being controlled by a non-inverted output of the first flip-flop; the output of the second AND gate being connected to an input of a third AND gate a second input of said third AND gate being controlled by the address signal, and its. output being connected to a setting input of a second flip-flop, said second flip-flop having an input, a selection line being connected to the input of said second flip-flop, the selection line being part of said control memory; a clock signal for controlling said first and second flip-flops at the reset inputs thereof serving for the data input and output to the individual column lines, a data register being formed by said shift register; a common resetting signal connected to an OR gate, the non-inverting output of the first flip-flop drivingly controlling a limiter logic; and the non-inverting output of the second flip-flop operatively controlling the row control logic.

10. Apparatus according to claim 9 including first, second and third NAND gates, the first NAND gate having a first input connected to the non-inverting output of the first flip-flop and a second input connected to the selection line of the part of the memory matrix formed by the control memory, said selection line also being connected to a first input of the second NAND gate; the second input of the second NAND gate being drivingly controlled by the output of the first NAND gate; the output of said second NAND gate being connected to a first input of the third NAND gate, the second input thereof being controlled by the external write signal, the output thereof being connected to control a self-blocking switching transistor which is connected with its source to a reference potenital and the drain of which is connected to all of the column lines through at least one diode each, the anode of which is connected to the column line assigned to the diode and the cathode of which is connected to the drain terminal of said switching transistor through a second diode.

11. Apparatus according to claim 10 wherein said row control logic includes a NAND gate having one input controlled by an external erase signal and another input controlled by the non-inverting output of the second flip-flop of the cycle control; the output of the NAND gate being connected to the gate of a self-blocking MOS field-effect transistor which is connected with its source to the reference potential and is connected through a voltage divider at its drain to the terminal for a supply voltage and having a dividing point, and a plurality of programming lines, each programming line being associated with a respective matrix row and being connected with said dividing point of the memory matrix in the part thereof forming the user memory and in the part thereof forming the control memory.

12. User memory with controlled erase operation comprising: a user memory in matrix form including non-volatile write-read memory cells, a control memory formed of non-erasable write-only memory cells for storing a control bit in the control memory before erasing the user memory, means for inhibiting erasure of the user memory, said means being operatively responsive to the presence of said control bit in the control memory.

13. A non-volatile user memory comprising a plurality of memory cells arranged as a matrix having rows and columns and a control memory having outputs, for storing a control bit in an empty memory location; a data register having data outputs; a comparator for comparing said control memory outputs with said data register outputs; means being responsive to said comparator for inhibiting erasure of the user memory before said control bit has been stored in said control memory.

* * * * *